F. LODY.
SAFETY HOOK.
APPLICATION FILED NOV. 5, 1913.

1,099,068.

Patented June 2, 1914.

Witnesses:
C. D. Swett.
B. N. Davis.

Inventor:
Franz Lody
by F. Dittmar
Attorney.

UNITED STATES PATENT OFFICE.

FRANZ LODY, OF PREETZ, GERMANY.

SAFETY-HOOK.

1,099,068.  Specification of Letters Patent. Patented June 2, 1914.

Application filed November 5, 1913. Serial No. 799,342.

*To all whom it may concern:*

Be it known that I, FRANZ LODY, subject of the German Emperor, residing at Preetz, Germany, have invented certain new and useful Improvements in Safety-Hooks, of which the following is a specification, reference being had therein to the accompanying drawing.

The present invention relates to a safety hook formed of one solid body piece $a$ having two noses or projections $f$ and $g$ which hooks or projections will permit the link $c$ of the chain to glide over the same. A depression $e$ will be found in the front part of the body $a$, which is to receive the second link of the chain $d$ while the first link is being placed on the body.

The accompanying drawing illustrates the invention in which—

Figure 1:
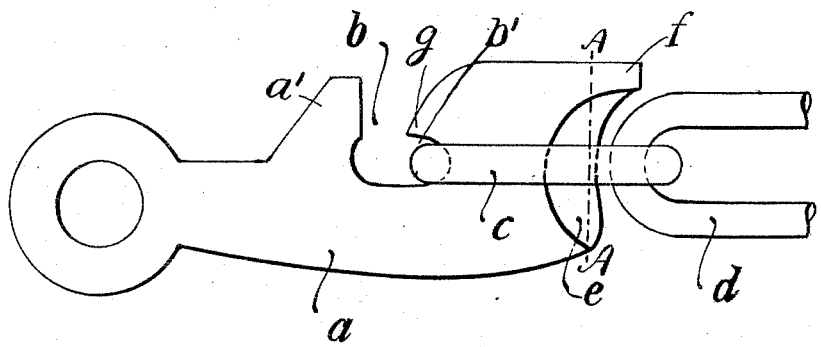
Figure 2:
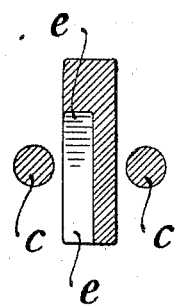

Figure 1 shows the safety hook with the chain seen from the side. Fig. 2 is a cross section of Fig. 1 on the lines A—A.

Further the body $a$ is formed with an inward recess or depression $b$.

In order to place the link $c$ in position over the hooks or projections $f$ and $g$, it will be necessary to push the second link $d$ into the inwardly curved recess $e$. As this is done the link $c$ of the chain will easily glide over the projections $f$ and $g$, into the deep depression $b$, and will rest in the undercut link seat $b'$. It will be noted that it is impossible that the chain link $c$ can become detached, even if the chain hangs loosely. The chain can only be released when the link $d$ is pushed into the recess $e$ otherwise the link $c$ could not be released. It will be noted that both hands will be required in order to release the chain, and that a self unlocking is impossible.

Claim.

A safety hook comprising a body portion having a deep cut on one edge and an undercut link seat connected therewith—a projecting nose on the upper edge of said body and an inwardly curved recess, beneath said projection.

In testimony whereof I affix my signature in the presence of two witnesses.

FRANZ LODY.

Witnesses:
 JULIUS ROPKE,
 KARL FRIEDRICH FREITZL.